United States Patent [19]
Tabankia et al.

[11] Patent Number: 4,965,338
[45] Date of Patent: Oct. 23, 1990

[54] PBT WITH IMPROVED TRACKING RESISTANCE

[75] Inventors: Farshid M. H. Tabankia, Brasschaat, Belgium; Jan de Boer, Bergen op Zoom, Netherlands

[73] Assignee: General Electric Company, Pittsfield, Mass.

[21] Appl. No.: 391,005

[22] Filed: Aug. 9, 1989

[30] Foreign Application Priority Data

Aug. 18, 1988 [NL] Netherlands .......................... 8802046

[51] Int. Cl.$^5$ ............................................ C08G 63/02
[52] U.S. Cl. ...................................... 528/272; 528/274; 528/275; 528/293; 528/308; 528/308.6; 528/381; 525/437; 524/605; 524/745
[58] Field of Search ............... 528/272, 274, 275, 293, 528/308, 308.6, 381; 525/437; 524/745, 605

[56] References Cited

U.S. PATENT DOCUMENTS

| | | | |
|---|---|---|---|
| 2,263,312 | 11/1941 | Reed | 526/33 |
| 3,169,121 | 2/1965 | Goldberg | 528/173 |
| 3,864,428 | 2/1975 | Nakamura et al. | 525/67 |
| 4,001,184 | 1/1977 | Scott | 528/182 |
| 4,636,544 | 1/1987 | Hepp | 524/411 |
| 4,687,802 | 8/1987 | Hepp | 524/411 |
| 4,713,408 | 12/1987 | Takahashi et al. | 524/161 |
| 4,791,158 | 12/1988 | Lausberg et al. | 524/156 |

FOREIGN PATENT DOCUMENTS 0185555 6/1986 European Pat. Off. .
1269740 4/1972 United Kingdom .

Primary Examiner—John Kight, III
Assistant Examiner—Sam A. Acquah
Attorney, Agent, or Firm—William F. Mufatti

[57] ABSTRACT

The properties of polyesters, in particular the tracking index and the antistatic properties, can be improved by the addition of a salt of an alkane sulphonic acid.

20 Claims, No Drawings

PBT WITH IMPROVED TRACKING RESISTANCE

The invention relates to the use of an alkane sulphonate salt, with more than eight carbon atoms in the alkane group, in polymer mixtures comprising a polyester having units derived from an alkanediol and an aromatic dicarboxylic acid.

The use of alkane sulphonate salts in polymer mixtures which comprise a polyester of the type described is known e.g. from EP-A-No. 0185555 corresponding to U.S. patent application Ser. No. 4713408 which is incorporated by reference herein in its entirety. An example of these known polymer mixtures are the polymer mixtures based on polyalkylene phthalate resins, more in particular based on polybutylene terephthalate which comprise a metal salt of an alkyl sulphonate to render such mixtures antistatic. EP-A-No. 0256461 corresponding to U.S. patent application Ser. No. 4791158 which is incorporated by reference herein in its entirety describes thermoplastic compositions comprising a polyester, a polycarbonate to which alkyl sulphonic acids have been added to improve the impact strength of the composition.

DE-A-No. 1908173 corresponding to GB-A-1269740 describes fibers made out of polyesters which have been rendered antistatic by incorporating therein alkali paraffin sulphonates.

The known polymer mixtures are thermoplastics; they may be processed, for example, by injection moulding.

Polyalkyl phthalate resins, in particular polybutylene terephthalates, are known due to their good electrical properties, for example, their tracking index.

The invention provides polymer mixtures based on a polyester of the type described hereinbefore which have a tracking index which is improved with respect to pure polyesters.

The use according to the invention is characterised in that the alkane sulphonate salt is used in a quantity of 1-10 parts by weight per 100 parts by weight of the polyester to improve the tracking index of the polymer mixture.

Alkane sulphonate salts are known per se as antistatically active auxiliary substances for synthetic resins. Other antistatically active auxiliary substances are also known for synthetic resins. Most of the known antistatically active auxiliary substances are not satisfactory for polyesters, in particular polyalkylene phthalates. Some substances, for example, sodium lauryl sulphate and polyethylene glycol, are hard to mix with the polyester in an extruder. Other substances, for example, alkane aryl sulphonate salts, result in a strong decrease of the stability of the polyester melt and provide hardly any antistatic properties.

It was quite surprising to find that the use of alkane sulphonate results in an improvement of the tracking index.

It has now been found that the use of alkane sulphonate salts does not show the problems mentioned hereinbefore. Moreover, antistatic properties in combination with good mechanical properties are obtained by using alkane sulphonate salts in polyesters of the above-described type.

The polymer mixture as used preferably comprises a polyester having more than 70 mol % of units derived from terephthalic acid and butane-1,4-diol.

In addition, the polymer mixture as used may comprise an aromatic polycarbonate, if present preferably in a quantity from 5 to 100 parts by weight per 100 parts by weight of polyester.

The polymer mixture as used may comprise any additive conventionally used for polyesters.

As an alkane sulphonate salt one uses preferably the sodium salt of a mixture of alkane sulphonic acids, the alkane groups comprising from 12 to 20 carbon atoms.

By using the alkane sulphonate salts according to the invention one obtains a polymer mixture which comprises at any rate one or more of the following constituents:
A. a polyester
B. an alkane sulphonate salt.

The polymer mixture may moreover comprise one or more of the following constituents:
C. an aromatic polycarbonate and
D. the conventionally used additives.

A. Polyester

The invention relates to polymer mixtures which comprise a polyester having units derived from an alkanediol and an aromatic dicarboxylic acid. The polyester may comprise units derived from one or more alkanediol compounds. The polyester may also comprise units derived from one or more aromatic dicarboxylic acids. In addition to the alkanediol the polyester may comprise units derived from one or more other diol compounds or polyol compounds.

In general the polyester comprises an excess of units derived from an alkanediol with respect to the optionally present units derived from other diol compounds or polyol compounds. Examples of suitable alkanediol compounds are ethanediol or butane-1,4-diol. In addition to units derived from aromatic dicarboxylic acids the polyester may also comprise units derived from other dicarboxylic acids or polycarboxylic acids. The greater part of the units derived from acids, however, is derived from an aromatic dicarboxylic acid. Suitable aromatic dicarboxylic acids are terephthalic acid and isophthalic acid.

A polyester having more than 70 mol % of units derived from terephthalic acid and butane-1,4-diol is preferably used as a polyester. It is also possible to use a mixture of one or more different polyesters.

B. Alkane sulphonate salt

The polymer mixture according to the invention comprises an alkane sulphonate salt having more than eight carbon atoms in the alkane group. Such salts are known as agents to render synthetic resins antistatic. They have not been used before in polyesters of the type described hereinbefore. The alkane group comprises more than eight carbon atoms; the alkane group preferably consists of a mixture of different ones having 12 to 20 carbon atoms. The metal of the salt may be, for example, an alkali metal or alkaline earth metal, for example, sodium, lithium and calcium.

C. Aromatic polycarbonate

Aromatic polycarbonates are materials known per se. They are generally prepared by reacting a dihydric phenol compound with a carbonate precursor, for example, phosgene, a halogen formate or a carbonate ester. Aromatic polycarbonates are polymers which comprise units of the formula

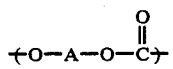

wherein A is a bivalent aromatic unit derived from the dihydric phenol used in the preparation of the polymer.

Mononuclear or polynuclear aromatic compounds which comprise two hydroxy radicals each directly bonded to a carbon atom of an aromatic nucleus may be used as dihydric phenols in the preparation of the aromatic polycarbonates.

The branched polycarbonates known per se as described, for example, in U.S. patent application No. 4,001,184 which is incorporated by reference herein in its entirety are also suitable.

Suitable aromatic polycarbonates are also the so-called polyester carbonates which are obtained by carrying out the polymerisation reaction in the presence of an ester precursor, for example, a difunctional carboxylic acid (for example, terephthalic acid or an ester derivative thereof). These polyester carbonates have ester compounds and carbonate compounds in the polymeric chain. Polyester carbonates are described, for example, in U.S. patent application No. 3,169,121 which is incorporated by reference herein in its entirety.

D. Conventional additives

The polymer mixture according to the invention may comprise any additive conventionally used for polymer mixtures based on polyester. By way of example may be mentioned: agents to improve the flame-retarding properties, fillers, reinforcing fibres, for example, glass fibres, stabilisers, pigments, and dyes.

When the polymer mixture also comprises an aromatic polycarbonate, a stabiliser is preferably also used to suppress a possible transesterification reaction between the polyester and the aromatic polycarbonate.

As an agent to improve the impact strength is preferably used in the polymer mixture according to the invention a core-shell polymer prepared in several steps and comprising a rubber-like core on which one or more shells have been grafted. The rubber-like core may be built up from rubber-like polyacrylates, or from rubber-like polydienes, for example, polybutadiene. The rubber-like core may comprise comonomers, for example, styrenes and/or acrylonitrile. Monomers, for example, acrylates and/or styrene compounds and/or acrylonitrile are grafted on the core.

The polymer mixture according to the invention may be obtained according to the conventional methods of preparing polymer mixtures, for example, by melt extrusion.

Examples I to VI, comparative example A

Various polymer mixtures were prepared starting from the following constituents:

PBT : Polybutylene terephthalate having an intrinsic viscosity of 122 ml/g measured in a phenol-tetrachloro-ethane 60/40 mixture at 25° C. according to ASTM D 2857-70 using a viscosimeter according to DIN 51562.

Alkane sulphonate salt: The sodium salt of a mixture of alkane sulphonic acids having 12–20 carbon atoms in the alkane group.

PC : An aromatic polycarbonate derived from bisphenol A and phosgene having an intrinsic viscosity of 58.5 ml/g measured in methylene chloride at 25° C.

Stab : A mixture of conventional stabilisers.

The above-mentioned constituents were extruded in an extruder. The resulting strands were chopped up to pellets. Standardised plates and rods were injection-moulded from the pellets to determine the CTI ("comparative tracking index") according to IEC, 1979 (3rd edition), the notch impact value according to Izod, the sheet resistance (according to DIN 50.014), the elongation at fracture.

The quantities of the above-mentioned constituents used and the found results are recorded in the table hereinafter.

TABLE

| Example | A | I | II | III | IV | V | VI |
|---|---|---|---|---|---|---|---|
| Composition (parts by weight) | | | | | | | |
| PBT | 100 | 100 | 100 | 100 | 100 | 100 | 100 |
| Alkane sulphonate salt | — | 3.1 | 4.2 | 5.3 | 3.7 | 5.0 | 6.3 |
| PC | — | — | — | — | 18.3 | 18.6 | 18.8 |
| Stab | 0.15 | 0.15 | 0.15 | 0.15 | 0.3 | 0.3 | 0.3 |
| Properties | | | | | | | |
| Sheet resistance (Ohm/sq) | $10^{14}$* | $10^{11}$ | $10^{10}$ | $10^{11}$ | $10^{12}$ | $10^{10}$ | $10^{11}$ |
| CTI-KC (V) | 450 | 600 | 550 | 500 | 600 | 400 | 500 |
| Notch impact value (J/M) | 49 | 47 | 51 | 52 | 55 | 56 | 56 |
| Elongation at fracture (%) | 69 | 102 | 162 | 72 | 38 | 32 | 19 |

*above $10^{14}$

It may be seen from the results recorded in the table that the addition of an alkane sulphonate salt to polymer mixtures comprising a polyester leads to a reduction of the sheet resistance and in addition to an increase of the tracking index. The mechanical properties are not noteworthily deteriorioated as a result of the addition of the salt. In some respects even an improvement occurs in the elongation at fracture (compare example I with comparative example A).

We claim:

1. Use of an alkane sulphonate salt, with more than eight carbon atoms in the alkane group, in polymer mixtures comprising a polyester having units derived from an alkanediol and an aromatic dicarboxylic acid, characterized in that the alkane sulphonate salt is used in a quantity of 1–10 parts by weight per 100 parts by weight of the polyester to improve the tracking index of the polymer mixture.

2. Use according to claim 1, wherein the polyester has more than 70 mol of units derived from terephthalic acid and butane-1,4-diol.

3. Use according to claim 1, in a polymer mixture which comprises besides the polyester an aromatic polycarbonate also.

4. Use according to claim 3, wherein the polymer mixture comprises 5-100 parts by weight of aromatic polycarbonate per 100 parts by weight of polyester.

5. Use according to claim 1 wherein the polymer mixture further comprises conventionally used additives.

6. Use according to claim 1 wherein the sodium salt of a mixture of alkane sulphonic acids, with the alkane groups comprising from 12 to 20 carbon atoms, is used as alkane sulphonate salt.

7. A method of improving the comparative tracking index of a polyester derived from an alkane diol and an aromatic dicarboxylic acid consisting essentially of adding to the polyester a comparative tracking index improving effective amount of an alkane sulphonate salt.

8. The method of claim 7 wherein the polyester is polybutylene terephthalate.

9. The method of claim 7 wherein the alkane sulphonate salt is the salt of a mixture of alkane sulphonic acids having about 12 to 20 carbon atoms in the alkane group.

10. The method of claim 9 wherein the salt is selected from the group consisting of the sodium salt, the calcium salt and the lithium salt.

11. The method of claim 7 wherein the effective amount of alkane sulphonate salt is about 1 to 10 parts by weight per 100 parts by weight of the polyester.

12. The method of claim 7 wherein the polyester comprises more than 70 mol % of units derived from terephthalic acid and butane-1, 4-diol.

13. The method of claim 7 further consisting essentially of adding an aromatic polycarbonate to the polyester to form a mixture of polyester and aromatic polycarbonate.

14. The method of claim 12 wherein the mixture comprises about 5 to 100 parts by weight of aromatic polycarbonate per 100 parts by weight of polyester.

15. The method of claim 7 further consisting essentially of at least one additive selected from the group consisting of flame-retarding agents, an agent to improve impact strength, fillers, reinforcing fibers, stabilisers, pigments and dyes.

16. A method of improving the comparative tracking index of a polyester derived from an alkane diol and an aromatic dicarboxylic acid consisting essentially of adding to the polyester about 1 to 10 parts by weight alkane sulphonate salt per 100 parts by weight of the polyester.

17. The method of claim 16 wherein the polyester is polybutylene terephthalate.

18. The method of claim 16 wherein the alkane sulphonate salt is the salt of a mixture of alkane sulphonic acids having about 12 to 20 carbon atoms in the alkane group.

19. The method of claim 18 wherein the salt is selected from the group consisting of the sodium salt, the calcium salt and the lithium salt.

20. The method of claim 16 further consisting essentially of adding to the polyester about 5 to 100 parts by weight of aromatic polycarbonate per 100 parts by weight of polyester.

* * * * *